(12) United States Patent
Benonysson

(10) Patent No.: US 10,072,850 B2
(45) Date of Patent: Sep. 11, 2018

(54) HEAT EXCHANGER AND METHOD FOR REGULATING A HEAT EXCHANGER

(75) Inventor: Atli Benonysson, Soenderborg (DK)

(73) Assignee: Danfoss A/S, Nordborg (DK)

( * ) Notice: Subject to any disclaimer, the term of this patent is extended or adjusted under 35 U.S.C. 154(b) by 797 days.

(21) Appl. No.: 12/066,834

(22) PCT Filed: Sep. 14, 2006

(86) PCT No.: PCT/DK2006/000507
§ 371 (c)(1),
(2), (4) Date: Aug. 14, 2008

(87) PCT Pub. No.: WO2007/031087
PCT Pub. Date: Mar. 22, 2007

(65) Prior Publication Data
US 2009/0020282 A1 Jan. 22, 2009

(30) Foreign Application Priority Data
Sep. 15, 2005 (DE) .......................... 10 2005 043 952

(51) Int. Cl.
*F24D 17/00* (2006.01)
*F24D 10/00* (2006.01)
(Continued)

(52) U.S. Cl.
CPC ....... *F24D 10/003* (2013.01); *F24D 17/0005* (2013.01); *F24D 19/1069* (2013.01); *F24H 9/2007* (2013.01); *Y02E 20/14* (2013.01)

(58) Field of Classification Search
CPC ............... F24D 10/003; F24D 19/1069; F24D 17/0005; F24D 17/001; F24H 9/2007
(Continued)

(56) References Cited

U.S. PATENT DOCUMENTS 3,172,462 A * 3/1965 Brunner ...................... 165/270
3,724,267 A * 4/1973 Zoschak ........................ 374/30
(Continued)

FOREIGN PATENT DOCUMENTS

DE 9418345 U1 3/1996
DE 19618415 A1 11/1997
(Continued)

OTHER PUBLICATIONS

PCT Search Report for Serial No. PCT/DK2006/000507 dated Jan. 16, 2007.

*Primary Examiner* — Devon Russell
(74) *Attorney, Agent, or Firm* — McCormick, Paulding & Huber LLP

(57) ABSTRACT

A heat exchanger (1) is specified having a housing (2), in which a primary side (3) having a primary-side flow path (5) is arranged between an upstream connector 6) and a downstream connector (7) and a secondary side (4) having a secondary-side flow path (10) is arranged between an inflow connector (11) and an outflow connector (12), wherein the primary side (3) and the secondary side (4) are in heat-transferring connection along a heat exchanger section (15) and a first temperature sensor (16) is arranged in the region of the outflow connector (12). The desire is to improve the ability to regulate and monitor the heat exchanger (1). To this end, there is provision for at least one second temperature sensor (18-20, 24, 25) to be arranged on the heat exchanger section (15) and for both temperature sensors (16; 18-20, 24, 25) to be connected to an evaluation device (21).

13 Claims, 2 Drawing Sheets

(51) Int. Cl.
*F24H 9/20* (2006.01)
*F24D 19/10* (2006.01)

(58) Field of Classification Search
USPC ............... 165/11.1, 95, 288, 289, 292, 293
See application file for complete search history.

(56) References Cited

U.S. PATENT DOCUMENTS

| | | | | |
|---|---|---|---|---|
| 4,244,216 | A * | 1/1981 | Dukelow | 374/39 |
| 4,482,006 | A * | 11/1984 | Anderson | 165/11.1 |
| 4,574,870 | A * | 3/1986 | Weitman | 165/292 |
| 5,005,351 | A * | 4/1991 | Archer | 60/686 |
| 5,385,202 | A * | 1/1995 | Drosdziok et al. | 165/11.1 |
| 5,615,733 | A * | 4/1997 | Yang | 165/11.1 |
| 5,992,505 | A * | 11/1999 | Moon | 165/11.1 |
| 6,926,076 | B2 * | 8/2005 | Blomgren | 165/167 |
| 7,069,976 | B2 * | 7/2006 | Lindgren | 165/11.1 |
| 7,726,874 | B2 * | 6/2010 | Kirchberg | 374/43 |
| 2004/0134637 | A1 * | 7/2004 | Helin et al. | 165/11.1 |

FOREIGN PATENT DOCUMENTS

| | | |
|---|---|---|
| DE | 102005043952 A1 | 4/2007 |
| EP | 0 155 826 A2 | 9/1985 |
| EP | 0 709 757 A1 | 5/1996 |
| WO | 82 01063 A1 | 4/1982 |
| WO | 01 42729 A1 | 6/2001 |
| WO | 03031370 A2 | 4/2003 |
| WO | 03/081348 A1 | 10/2003 |
| WO | 2005/066571 A1 | 7/2005 |
| WO | 2007031087 A1 | 3/2007 |

* cited by examiner

HEAT EXCHANGER AND METHOD FOR REGULATING A HEAT EXCHANGER

CROSS REFERENCE TO RELATED APPLICATIONS

This application is entitled to the benefit of and incorporates by reference essential subject matter disclosed in International Patent Application No. PCT/DK2006/000507 filed on Sep. 14, 2006 and German Patent Application No. 10 2005 043 952.7 filed Sep. 15, 2005.

TECHNICAL FIELD

The invention concerns a heat exchanger with a housing having arranged in it a primary side with a primary-side flow path between an upstream connector and a downstream connector and a secondary side with a secondary-side flow path between an inflow connector and an outflow connector, wherein the primary side and the secondary side stand in heat exchange connection with one another along a heat exchange stretch with a temperature sensor being arranged in the region of the outflow connector. The invention further concerns a method for the control of a heat exchanger having a primary-side flow path and a secondary-side flow path where the primary-side flow path and the secondary-side flow path stand in heat exchange connection with one another and a temperature sensor is arranged in the region of the secondary-side flow path.

BACKGROUND OF THE INVENTION

One such type of heat exchanger often is used to heat consumable water and heating water in living units, with the heat energy being supplied from a remote heating system. The heat carrying fluid, most often hot water, delivered by the heating system flows through the primary-side flow path and in doing so transfers heat to the consumable water or to the heating fluid which flows through the secondary-side flow path. As a rule, the fluids flowing through the primary-side flow path and the secondary-side flow path flow in opposite directions, so that the water of the secondary side can be heated to a temperature higher than the temperature of the fluid at the downstream connector of the primary side.

To maintain a quite exact temperature adjustment at the outflow connector, the flow of the heat carrying fluid of the primary side is controlled in dependence on the heat given off by the secondary side. This will be explained below by way of example, in which consumable water is heated in the heat exchanger. As soon as consumable water is taken from the outflow connector of the secondary side, cold consumable water flows into the inflow connector. Accordingly, at almost the same time, heat carrying fluid must be able to flow through the primary-side flow path so that sufficient heat can be transferred to the secondary side.

In order to control or regulate a valve so that the fluid flow of the primary side is controlled, frequently a temperature sensor is used to regulate the valve.

BRIEF DESCRIPTION OF THE INVENTION

It is the object of the invention to improve the ability to regulate and monitor a heat exchanger.

This object is solved in the case of a heat exchanger of the previously mentioned kind in that at least a second temperature sensor is arranged at the heat exchange stretch and in that both of the temperature sensors are connected with an evaluation device. Through the use of additional temperature sensor, more condition information about the heat exchanger is obtained. The more information made available, the more accurately the through flow of the heat carrying medium through the primary side can be controlled. Moreover, the additional temperature sensor enables the making of an assertion about the fouling of the heat exchanger. This is especially advantageous in the case of heat exchangers which can be dismantled for maintenance.

Preferably, the second temperature sensor is arranged at a pre-determined spacing along the heat transfer stretch relative to the first temperature sensor. The second temperature sensor is accordingly arranged at another position different from that of the first temperature sensor. This for example has the advantage that a temperature change can be recognized by the second temperature sensor before the first temperature sensor is in the position to report this temperature. Therefore, if wanted, the actuation of the valve on the primary side can be performed earlier, for example, to earlier open or to earlier close the valve. With two temperature sensors the course of the temperature over the heat exchanger can be roughly portrayed. The portrayal becomes improved when the greater number of temperature sensors are provided.

Preferably, the second temperature sensor is arranged in the middle of the heat exchanger stretch. This temperature sensor arrangement in the middle of the heat exchanger stretch permits an assessment of the loading of the heat exchanger. If the loading is known, the control of the valve on the primary side can be improved so that a quicker and more exact reaction is achieved when one wants to take water from the outflow connector.

Alternatively or additionally to this, the second temperature sensor can be arranged in the region of the inflow connector. The second temperature sensor in this case detects the temperature of the inflowing fluid. This also is a piece of worthwhile information. If the input temperature of the consumable water or of the heating water to the secondary side is known, then the valve on the primary side can be controlled depending on the temperature difference between the temperature at the inflow connector and the desired temperature at the outflow connector.

In a preferred implementation, the second temperature sensor is connected with a controller which controls a valve, controlling fluid flow through the primary side depending on a temperature detected by a first temperature sensor, with the second temperature sensor having an effect on at least one control parameter of the controller. For example, the second temperature sensor can have an effect on the amplification of the controller if the controller is a P-controller or a controller with a P-part (PI-controller or PID-controller). If the chosen amplification is too high, then a risk of oscillation occurs. If on the other hand, the chosen amplification is to low, then a danger exists that the controller will take to long to react. If now the information coming from the second temperature sensor is evaluated, it can be seen to that the amplification is always suited to certain data. For example, if the loading of the heat exchanger is relatively high, which can be detected by a placement of the second temperature sensor somewhat in the middle of the heat exchanger stretch, then a relatively high amplification is chosen, without having to fear a high oscillation. The same is true if the second temperature sensor is placed at the inflow connector. If the second temperature sensor in this case detects a low temperature, then the amplification of the controller can be set high. In the reverse of this, the amplification is lowered if already the input temperature at the inflow connector is high or if the second temperature sensor determines that the loading of the heat exchanger is low.

It is also beneficial if the evaluation device includes a difference former which detects the temperature difference between the first and the second temperature sensors. Such a temperature difference can not only be used to effect the controller, but one can also determine whether the heat exchanger over time has become clogged. This so called "fouling" causes the heat transfer between the primary side and the secondary side with time to become impaired. This impairment can be detected by way of the temperature difference, as well as also by way of the course of a temperature characteristic line.

This is then especially the case if the difference former is connected with a course monitoring device. It can therefore be determined at different times how the temperature differences are maintained. If one determines, for example, that the temperature difference between the first temperature sensor and the second temperature sensor has become smaller while the same amount of heat is delivered to the primary side, then a clogging of the heat exchanger can be surmised.

An object of the invention is also solved by a method of the previously mentioned kind in that an evaluation device utilizes several temperature sensors to determine a temperature course of the primary side flow path and/or the secondary-side flow path and that the evaluation device with the help of the temperature sensors determines a temperature difference between the primary side and the secondary side flow paths.

If a temperature course is known, the control of the heat carrying medium through the primary side can be improved. Monitoring the temperature difference enables an assessment of when the heat exchanger must be attended to.

BRIEF DESCRIPTION OF THE DRAWINGS

The invention is described in more detail in the following by way of a preferred embodiment in combination with the drawings. The drawings are.

DETAILED DESCRIPTION

Figure 1:
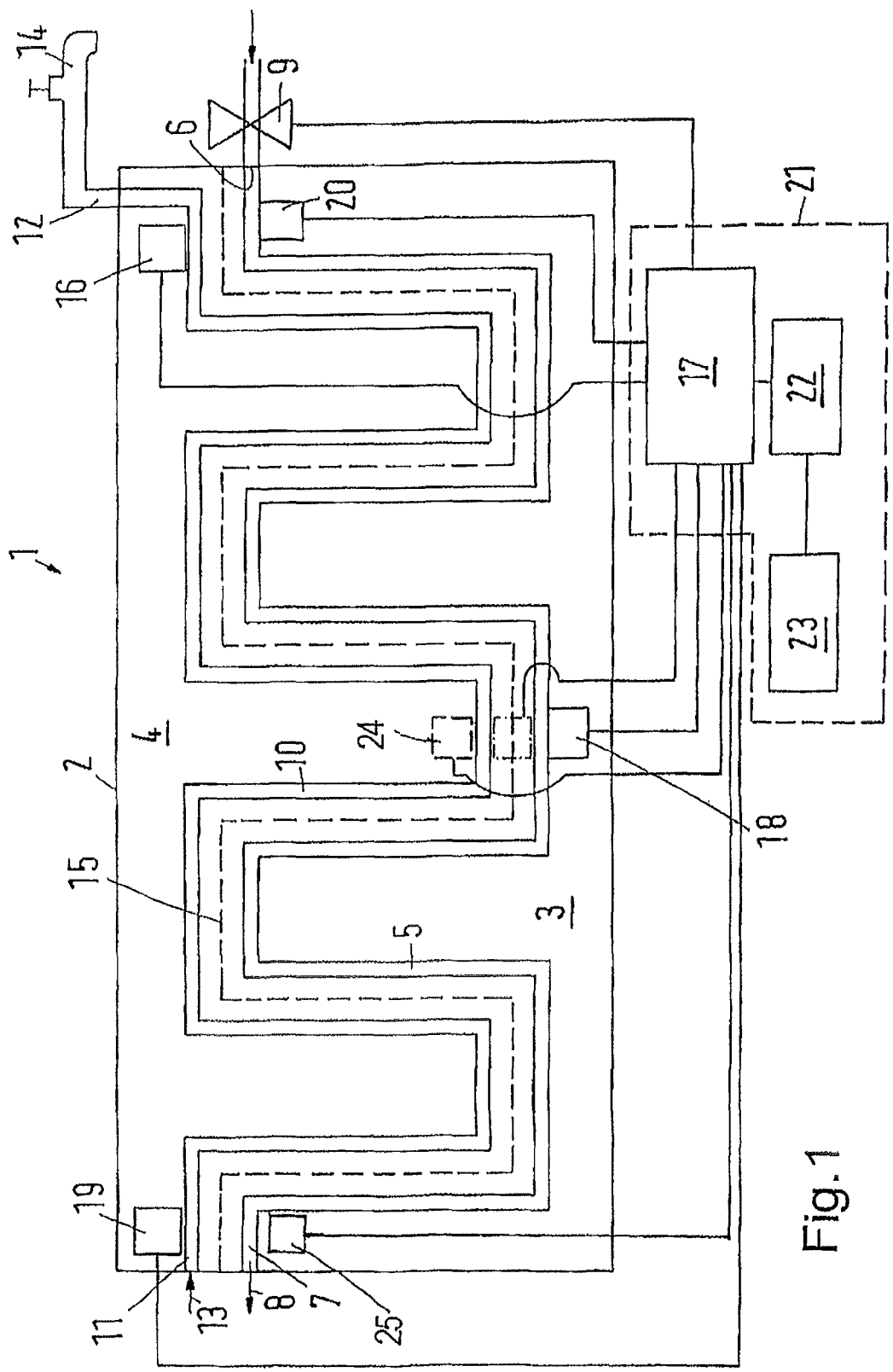
FIG. 1 is a schematic illustration of a heat exchanger.

A heat exchanger 1 has a housing 2 with a primary side 3 and a secondary side 4. The primary side 3 has a primary-side flow path 5, which extends between an upstream connector 6 and a downstream connector 7, and through which path a heat carrying fluid can flow in the direction of the arrow 8. The heat bearing fluid can, for example, be supplied by a remote heater. The heat exchanger 1 in the present case serves to heat consumable water for a one family house.

A valve 9 is provided to control the flow through the primary-side flow path 5, the valve in the present case is located outside of the housing 2. The control of the valve 9 is described in greater detail below.

The secondary side 4 has a secondary-side flow path 10 which extends between an inflow connector 11 and an outflow connector 12. The secondary-side flow path accommodates flow in the direction of the arrow 13 when a tapping station 14 is open. The tapping station 14 can, for example, be implemented by a hot water faucet.

As indicated by a broken line, the primary side 3 is in heat exchanging connection with the secondary side 4 along a heat exchanging stretch 15. The illustration of FIG. 1 is however only schematic. In the case of actual heat exchangers, the primary-side flow path 5 and the secondary-flow path 10 are, for example, realized in that corrugated or bent sheets so lie on one another, that in cross section, a honeycomb structure of flow paths is provided with some of these "flow paths" belonging to the primary-side flow path 5 and with the remaining "flow paths" belonging to the secondary-side flow path 10. The heat exchanging surface arrangement is then formed by the walls of the honeycomb. The heat carrying fluid which flows on the primary side 3 in opposition to the fluid on the secondary side 4 gives along the heat exchange stretch 15 its heat to the liquid on the secondary side. Because of the oppositely directed through flows one can heat the fluid of the secondary side to a relatively high temperature. In a typical operation the fluid flowing into the upstream connector 6 has a temperature in the range of between 60 and 120° C. and leaves the heat exchanger at the downstream connector 7 with a temperature in the region of 15 to 40° C. (depending on the amount of heat exchanged). The fluid on the secondary side enters the inflow connector 11 with a temperature in the region of 5 to 15° C. and in its flow through the secondary side is heated to a temperature in the region of 50 to 60° C.

A first temperature sensor 16 is arranged in the region of the outflow connector 12 for the control of the valve 9. This first temperature sensor 16 determines essentially the temperature of the fluid, for example, consumable water, dispensed from the tapping station 14. It can, in narrower circumstances, also be influenced by the temperature on the primary side 3. The first temperature sensor 16 is connected with a controller 17, which depending on a temperature difference between a desired value and the actual value determined by the first temperature 16, controls the valve so that heat carrying fluid with an increased temperature flows through the primary side 3. Thereby heat is transferred to the secondary side 4 so that the temperature at the outflow connector 12 after a short or long time achieves the desired value.

If the tapping station 14 is opened, then fresh consumable water flows through the secondary flow path so that the temperature in the region of the first temperature 16 falls.

Additionally, a second temperature sensor 24 is provided on the secondary side 4 of the heat exchanger 1. This second temperature sensor 24 is arranged along the heat exchange stretch 15 at a certain spacing from the first temperature sensor 16. In the illustrated case it is arranged at the middle of the heat exchange stretch 15.

With the help of the second temperature sensor 24, it is possible to determine the course of the temperature along the length of the secondary side 4 of the heat exchanger 1. To still better determine this temperature course, still further sensors can be used: for example, a third temperature sensor 19 arranged at the inflow connector 11.

The temperature course provides evidence of the loading of the heat exchanger 1. This is particularly so, if one evaluates the temperature information supplied by the second temperature sensor 24.

If one evaluates the temperature information of the third temperature sensor 19, one obtains information about external conditions, for example, the temperature of the inflowing consumable water.

Finally, one can also arrange a fourth temperature sensor 20 in the region of the upstream connector 6. With the help of this fourth temperature sensor 20 one can make a statement about the input temperature of the primary side or about the temperature difference between the input temperature on the primary side and the output temperature on the secondary side. In a similar way the primary side 3 also has a fifth temperature sensor 18 and a sixth temperature sensor 25 so that the temperature course of the primary side can also be determined.

In this exemplary embodiment, the input temperature at the upstream connector 6 is controlled by a remote heating system. With the help of the temperature sensors 16, 20 it is possible to control relatively exactly the temperature at the tapping station 14.

If one comprehends the temperature course then one can react more quickly to load changes. The load changes show themselves in advance of a point in time at which one can recognize a corresponding temperature fall at the outflow connector 12 of the secondary side 4.

Figure 2:
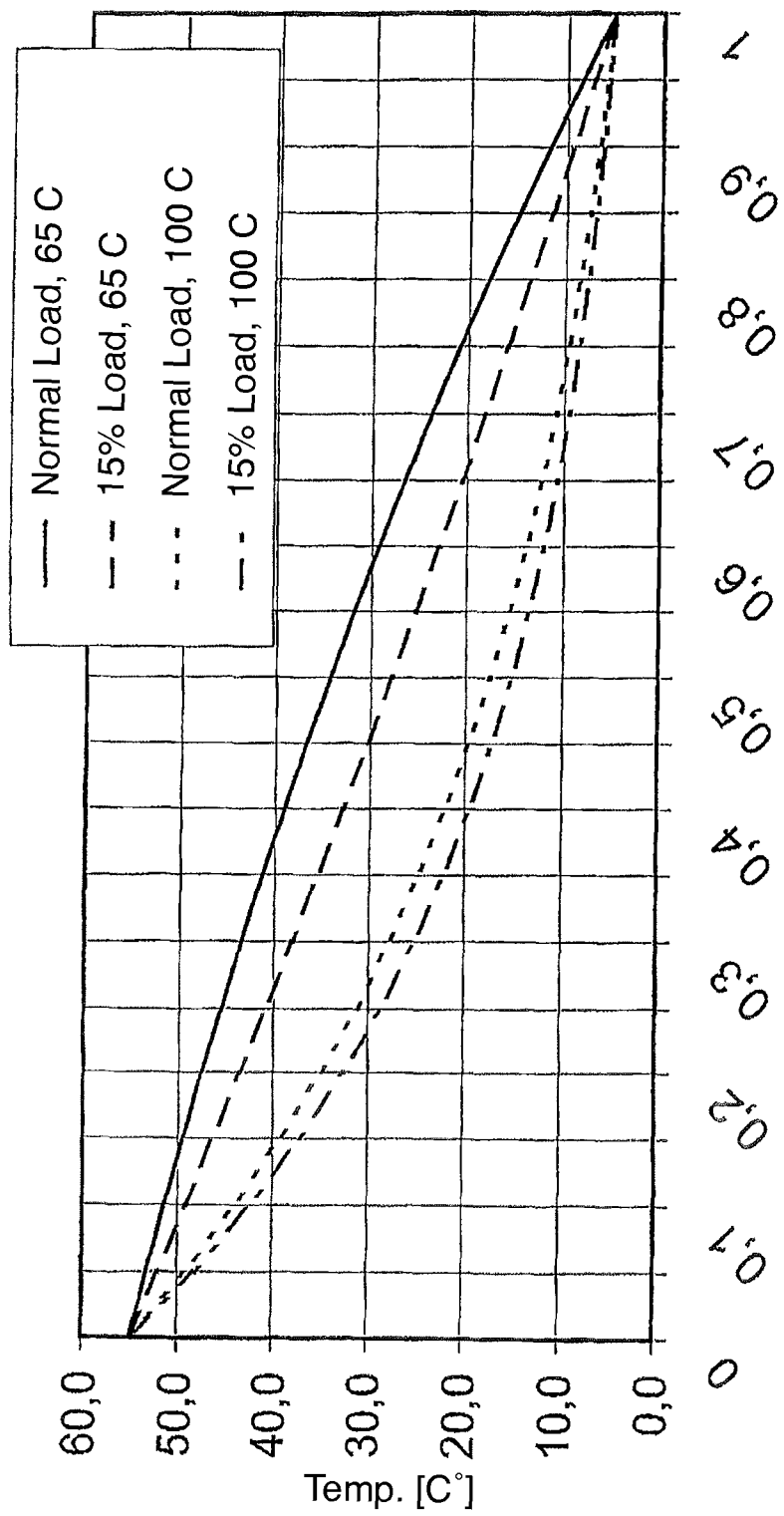
FIG. 2 is characteristic lines of a heat exchanger with oppositely directed through flows.

FIG. 2 shows the temperature course of the heat exchanger on the secondary-side flow path 10. Four different characteristic lines A to D are shown. Line A shows the temperature course in the case of a normal loading of the heat exchanger. The inflow temperature on the primary side at the upstream connector 6 is 65° C., and the inflow temperature of the consumable water at the inflow connector 11 is 10° C. The temperature increases the longer the supplied consumable water moves into the heat exchanging stretch. With the application of the second temperature 24 in the middle, that is at an effective heat exchange surface of 0.5, a temperature of about 34° C. is measured. At a lower loading of 15% the temperature of the heat exchanger at the middle falls to 28° C., as is shown by the characteristic line B. The characteristic lines C and D show respectively the temperature course at normal loading and at 15% loading when the inflow temperature of the primary side is at 100° C. The characteristic lines of the heat exchanger change greatly with the loading and the inflow temperature, and the temperature change is greatest in the middle of the heat exchanger, so that the temperature sensor 24 is advantageously applied here.

Finally, it is also possible, from the temperature course, with the help of the temperature sensors, that is at least with the help of the second temperature sensor 18 or with the help of the third temperature sensor 19, to conclude that a "fouling" has occurred, that is that a slow clogging of the heat exchanger has taken place.

As is to be recognized from FIG. 1, the temperature sensors 16, 18-20, 24, 25 (not all of these temperature sensors need be provided) are connected with the controller 17. These temperatures sensors 16, 18-20, 24, 25 are in the position to affect at least one control parameter of the controller 17. As to this control parameter, it can, for example, be the amplification of the P component of a P of a P-, PI- or PID controller. If, for example, the temperature difference between the upstream connector 6 and the outflow connector 12 is too large, the amplification is decreased. If, for example, the temperature at the position of a further temperature sensor 18 falls while the outer temperature at the secondary side remains the same, then the control parameter of the controller 17 is changed. If the controller is formed as a PI controller, then the parameter P or the parameter I or both are changed in order to achieve an improved reaction of the controller 17 to changes. For example, in the case of a load increase with a high inlet temperature, the controller need not open as much as it would with a low input temperature. Similar considerations also apply when the load or loading changes. In the case of a low temperature, then under given circumstances larger changes in the opening of the valve 9 on the primary side 3 are necessary than with the high temperatures.

The controller 17 is a component of an evaluation device 21 also having a difference former 22 and a course supervising device 23. The difference former 22 determines a temperature difference between the first temperature sensor 16 and the sensor 20, between the sensor 24 and the sensor 18, and between the sensor 19 and the sensor 25. The course supervising apparatus supervises these temperature differences over time. The difference former thereby creates point wise local temperature differences measured at the primary and secondary sides of the flow paths 5 and 10. The controller 17 determines an average of each of the local differences. A cross section can, for example, be calculated over 24 hours. The temperature difference between the temperature sensors 19 and 25 is of special interest because at these spots in the case of a fouling of the heat exchanger the temperature difference is the greatest and therefore most evident. If it is, for example, determined that in the case of otherwise unchanged conditions the temperature difference between the inflow connector 11 and the in turn connector 7 has become larger, then the water which flows through the primary side 3 is no longer so well cooled. In other words, the heat transfer from the primary side 3 to the secondary side 4 is hindered which is a clear indication that the heat exchanger 1 is slowly becoming clogged.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A heat exchanger with a housing, comprising:
    a hot side with a hot-side flow path between an upstream connector connected to a heater and a downstream connector;
    a cold side with a cold-side flow path between an inflow connector and an outflow connector;
    wherein the hot side and the cold side stand in heat transfer connection along a heat transfer stretch;
    a first temperature sensor arranged in the cold-side flow path in the region of the outflow connector for measuring a first temperature of a fluid in the cold-side flow path;
    a second temperature sensor arranged in the hot-side flow path in the region of the upstream connector for measuring a second temperature of a fluid in the hot-side flow path;
    wherein both the first and second temperature sensors are connected to an evaluation device comprising a P controller, PI controller or PID controller for controlling a valve that controls the flow through the hot-side flow path;
    wherein the evaluation device controls the flow through the hot-side flow path in dependence on a temperature difference between the first temperature of the fluid in the cold-side flow path and the second temperature of the fluid in the hot-side flow path.

2. The heat exchanger according to claim 1, wherein the evaluation device includes a difference former that determines the temperature difference between the first temperature of the fluid in the cold-side flow path and the second temperature of the fluid in the hot-side flow path.

3. The heat exchanger according to claim 2 wherein the difference former is connected with a course supervising device.

4. The heat exchanger according to claim 1, wherein the evaluation device decreases the amplification of a P control parameter of the P controller, PI controller or PID controller when the temperature difference between the first temperature of the fluid in the cold-side flow path and the second temperature of the fluid in the hot-side flow path exceeds a predefined threshold.

5. The heat exchanger according to claim 1, further comprising a third temperature sensor arranged in the hot-side flow path at the heat transfer stretch for measuring a third temperature of the fluid in the hot-side flow path;
   wherein the evaluation device comprises the PI controller; and
   wherein the evaluation device changes at least one of a P control parameter and I controller parameter of the PI controller when the third temperature of the fluid in the hot-side flow path falls and the first temperature of a fluid in the cold-side flow path remains the same.

6. A method for the control of a heat exchanger including a primary-side flow path between an upstream connector connected to a heater and a downstream connector and a secondary-side flow path between an inflow connector and an outflow connector, with the primary side flow path and the secondary side flow path standing in heat transfer connection along a heat transfer stretch, a first temperature sensor arranged in the secondary-side flow path in the region of the outflow connector and a second temperature sensor arranged in the primary-side flow path in the region of the upstream connector, comprising the steps of:
   an evaluation device determining a temperature course of the primary-side flow path and/or the secondary-side flow path by means of the first and second temperature sensors, the evaluation device comprising a P controller, PI controller or PID controller controlling a valve that controls the flow through the primary-side flow path;
   the evaluation device determining a temperature difference between the primary-side flow path and the secondary-side flow path by means of the first and second temperature sensors; and
   the evaluation device controlling the flow through the primary-side flow path based on the temperature difference between the primary-side flow path and the secondary-side flow path.

7. The method according to claim 6, further comprising the step of:
   the evaluation device decreasing the amplification of a P control parameter of the P controller, PI controller or PID controller when the temperature difference between the first temperature of the fluid in the cold-side flow path and the second temperature of the fluid in the hot-side flow path exceeds a predefined threshold.

8. The method according to claim 6, wherein the heat exchanger includes a third temperature sensor arranged in the hot-side flow path at the heat transfer stretch for measuring a third temperature of the fluid in the hot-side flow path; and
   wherein the evaluation device comprises the PI controller; and
   and further comprising the step of:
   the evaluation device changing at least one of a P control parameter and I controller parameter of the PI controller when the third temperature of the fluid in the hot-side flow path falls and the first temperature of a fluid in the cold-side flow path remains the same.

9. A heat exchanger with a housing, comprising:
   at least three bent sheets that lie on one another and form a honeycomb structure that defines a hot-side flow path and a cold-side flow path in heat transfer connection along a heat transfer stretch;
   the hot-side flow path extending between an upstream connector connected to a heater and a downstream connector;
   the cold-side flow path extending between an inflow connector and an outflow connector;
   a first temperature sensor arranged in the cold-side flow path in the region of the outflow connector for measuring a first temperature of a fluid in the cold-side flow path;
   a second temperature sensor arranged in the hot-side flow path in the region of the upstream connector for measuring a second temperature of a fluid in the hot-side flow path;
   wherein both the first and second temperature sensors are connected to an evaluation device comprising a controller for controlling a valve that controls the flow through the hot-side flow path;
   wherein the evaluation device controls the flow through the hot-side flow path in dependence on a temperature difference between the first temperature of the fluid in the cold-side flow path and the second temperature of the fluid in the hot-side flow path.

10. The heat exchanger according to claim 9, wherein the evaluation device includes a difference former that determines the temperature difference between the first temperature of the fluid in the cold-side flow path and the second temperature of the fluid in the hot-side flow path.

11. The heat exchanger according to claim 10 wherein the difference former is connected with a course supervising device.

12. The heat exchanger according to claim 9, wherein the controller is a P controller, PI controller or PID controller; and
   wherein the evaluation device decreases the amplification of a P control parameter of the P controller, PI controller or PID controller when the temperature difference between the first temperature of the fluid in the cold-side flow path and the second temperature of the fluid in the hot-side flow path exceeds a predefined threshold.

13. The heat exchanger according to claim 9, further comprising a third temperature sensor arranged in the hot-side flow path at the heat transfer stretch for measuring a third temperature of the fluid in the hot-side flow path;
   wherein the controller is a PI controller; and
   wherein the evaluation device changes at least one of a P control parameter and I controller parameter of the PI controller when the third temperature of the fluid in the hot-side flow path falls and the first temperature of a fluid in the cold-side flow path remains the same.

* * * * *